United States Patent [19]

Efantis

[11] Patent Number: 5,241,443
[45] Date of Patent: Aug. 31, 1993

[54] TRANSFORMER FAULT PROTECTION DEVICE

[75] Inventor: Antonios Efantis, Don Mills, Canada

[73] Assignee: Jannock Electrical Products Inc., Toronto, Canada

[21] Appl. No.: 641,000

[22] Filed: Jan. 14, 1991

[51] Int. Cl.⁵ .............................................. H02H 3/32
[52] U.S. Cl. ......................................... 361/36; 361/45; 361/49; 324/509
[58] Field of Search .................. 361/36, 45, 78, 51, 361/42; 324/509

[56] References Cited

U.S. PATENT DOCUMENTS

| | | | |
|---|---|---|---|
| 3,641,393 | 3/1972 | Florance et al. | 361/45 |
| 3,857,069 | 12/1974 | Howell | 361/45 |
| 3,869,664 | 3/1975 | Safer et al. | 324/51 |
| 3,878,459 | 4/1975 | Hanna | 324/51 |
| 4,080,640 | 3/1978 | Elms et al. | 361/45 |
| 4,095,174 | 6/1978 | Ishido | 324/52 |
| 4,216,515 | 8/1980 | Van Zeeland | 361/45 |
| 4,274,051 | 6/1981 | Condon | 324/117 R |
| 4,280,124 | 7/1981 | Wuertele | 340/650 |
| 4,318,151 | 3/1982 | Balchin | 361/45 |
| 4,507,698 | 3/1985 | Nilssen | 361/42 |
| 4,663,571 | 5/1987 | Nilssen | 315/244 |
| 4,675,576 | 6/1987 | Nilssen | 315/242 |
| 4,791,517 | 12/1988 | Park | 361/42 |
| 4,864,242 | 9/1989 | Hurley | 324/510 |

Primary Examiner—Todd E. DeBoer
Attorney, Agent, or Firm—Mason, Fenwick & Lawrence

[57] ABSTRACT

A transformer ground fault protector is provided and includes sensing means in the form of at least one conductive plate adjacent but spaced from the output of each secondary winding in a transformer having its secondary windings connected in series and at the midpoint of the series circuit to ground. The at least one conductive plate forms a capacitive circuit with the windings and provides an output voltage when the secondary windings are energized and unbalanced. The output voltage generated by the at least one conductive plate in normal operation of the transformer, is substantially equal to zero volts. However, when a fault occurs in the transformer, the output voltage induced in the at least one conductive plate has a magnitude greater than zero. The resultant voltage in turn is conveyed to a comparator which compares the magnitude of the resultant voltage with a predetermined threshold voltage. When the resultant voltage is greater than the predetermined threshold voltage, the comparator provides a positive output voltage which is used to bias a switch connected in series with the transformer primary winding to an open condition thereby to isolate the primary welding from its power supply. An LED is illuminated when the primary welding is isolated from the power supply to provide a visual indication of the transformer fault condition.

19 Claims, 5 Drawing Sheets

TRANSFORMER FAULT PROTECTION DEVICE

The present invention relates to protection devices and in particular to a transformer fault protection device.

Protection devices for electrical circuits are well known in the art and typically function to isolate the energized electrical circuit from a power supply when a fault in the circuit is detected. For example, U.S. Pat. No. 3,641,393 to Florance et al; U.S. Pat. No. 3,857,069 to Howell; U.S. Pat. No. 4,080,640 to Elms et al; U.S. Pat. No. 4,216,515 to Van Zeeland; and U.S. Pat. No. 4,318,151 to Balchin all show ground fault circuit interrupters designed to provide protection to humans accidentally causing a ground fault in the circuit. Each of the devices disclosed in these references includes a current transformer through which the power supply lines pass. The current transformer is operable to detect an imbalance in the current on each line occurring due to a fault in the circuit. The output of the current transformer is used to trip a relay so that the power supply lines passing through the current transformer are isolated from the power supply when the fault occurs.

Protection devices for other devices or circuits besides power supply lines are desirable as often faults may occur which can result in severe damage to equipment or injury to humans. For instance, it is desirable to provide fault protection in a neon or luminous tube transformer since these devices typically are used to step a conventional 120 volt power supply up to 15,000 volts. In this type of transformer, many problems can arise if faults occur at the secondary side of the transformer. For example, an arcing ground fault may develop in the wiring or at the tube receptacles due to aging, dirt accumulation, etc. and this type of fault may exist indefinitely presenting a serious fire hazard since any combustible materials in the vicinity of the arc are likely to ignite. In addition if the neon tube breaks, the secondary windings of the transformer along with the high voltage wiring will be subjected to the full open circuit voltage again creating a possible fire hazard and increasing the risk of electrical shock since the secondary windings are energized but the sign is not lit.

Although the use of the current transformers to detect a circuit fault is satisfactory in the environments disclosed in previously mentioned U.S. Patents, their use is not convenient or economical in all applications. In neon or luminous tube transformers, the use of a current transformer to detect the occurrence of a ground fault on the secondary windings is impractical. This is in view of the fact that when using a current transformer, the two high voltage leads from the secondary or the secondary winding midpoint before it is grounded have to pass through the current transformer. If the high voltage leads are passed through the current transformer, the current transformer must be extremely well insulated. Alternatively, if the midpoint ground conductor is passed through the current transformer, internal modification of the luminous tube transformer is required. Both approaches add considerable cost and complexity.

It is therefore an object of the present invention to provide a novel transformer fault protection device and a transformer incorporating such a device.

Broadly stated one aspect of the present invention provides a transformer fault protection device for a transformer having a primary and at least two secondaries connected to ground comprising:

capacitive sensing means for sensing the output voltage generated by each of said secondaries and generating a control signal when an imbalance in the output voltages generated by said secondaries is detected; and switch means to be connected in series with a power supply and at least one terminal of said primary, said switch means being conditioned to an open condition in response to said control signal.

A transformer having a primary winding and a pair of secondary windings connected in series with the midpoint of the series circuit being connected to ground incorporating the transformer fault protection device is also provided.

In one embodiment, it is preferred that the sensing means is in the form of a single, continuous conductive plate spaced from yet extending the length of the transformer core. The conductive plate provides an output voltage when an imbalance in the voltages at the transformer secondary windings occur as a result of a transformer fault.

In another embodiment, it is preferred that the sensing means is in the form of a pair of clips each having a conductive plate, the clips being located either adjacent each secondary winding or adjacent the output conductor extending from the transformer secondary winding terminals. In this embodiment, the output voltage induced in the conductive plate in each clip by the energized secondary windings are combined and cancel each other when the transformer is operating normally. However, when a transformer fault occurs, the voltage induced in each clip is different in magnitude and opposite in phase. Thus, when combined a resultant voltage is generated and is used to actuate the switch means to isolate the transformer primary winding from the power supply.

It is also preferred that the device includes comparing means which receives the output voltage from the sensing means as well as a threshold voltage and provides a signal to the switch means to isolate the transformer primary winding from the power supply only when the output voltage is detected as being greater than the threshold voltage.

Preferably the device also includes indication means for providing a visual indication that the switch means has isolated the transformer primary winding from the power supply and reset means for resetting the switch means to reconnect the transformer primary winding to the power supply once the transformer fault has been removed.

In one embodiment, it is preferred that the switch means is in the form of a semiconductor switch which is connected in series with the transformer primary welding and which is operable to isolate the transformer primary winding from the power supply upon conditioning by the comparing means. In another embodiment, it is preferred that the switch means is in the form of a pair of relay contacts, each of which is connected in series with opposite terminals of the transformer primary winding with the relay contacts being operable to isolate both terminals of the primary winding from the power supply in response to the output of the comparing means.

The present invention provides advantages in that if a fault occurs in the transformer, the transformer primary winding is isolated from the power supply thereby substantially eliminating the possibility of electrical shock from occurring. In addition, since conductive sensing means spaced from the transformer secondary windings or from conductors extending from the secondary windings are used to generate the control signal signifying a transformer fault, no modification of the transformer or direct electrical connections need to be made to the high voltage transformer secondary windings. Moreover, since a threshold voltage must be reached before the transformer primary winding is isolated from the power supply, small imbalances in the voltages at the transformer secondary windings occurring due to other reasons besides faults do not result in the isolation of the transformer primary winding from the power supply.

Embodiments of the present invention will now be described by way of example only with reference to the accompanying drawings in which.

Figure 1:
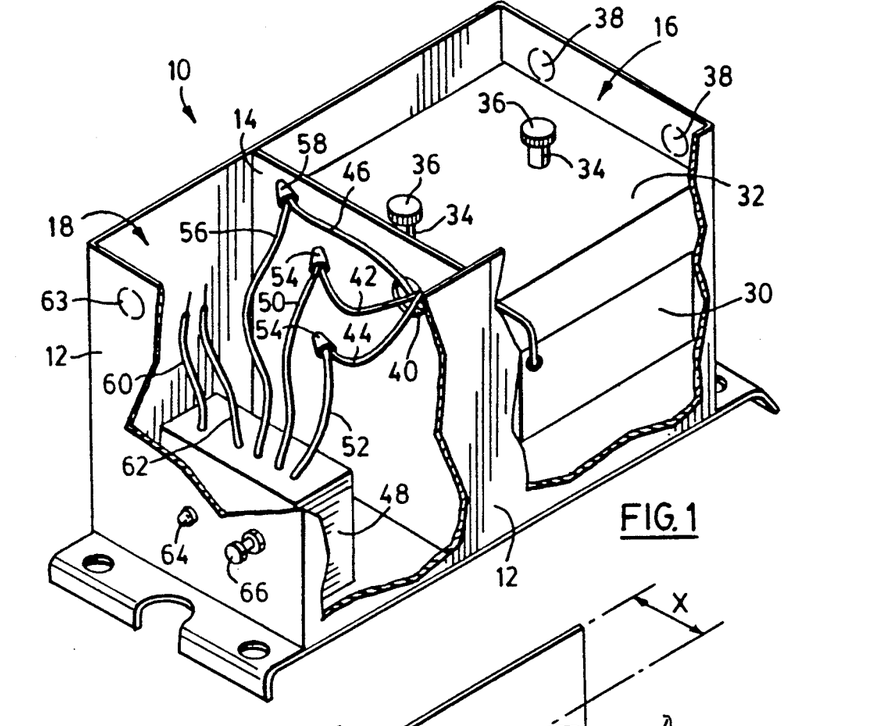
FIG. 1 is a partially cut-away perspective view of a luminous tube transformer incorporating a transformer fault protector.
Figure 2:
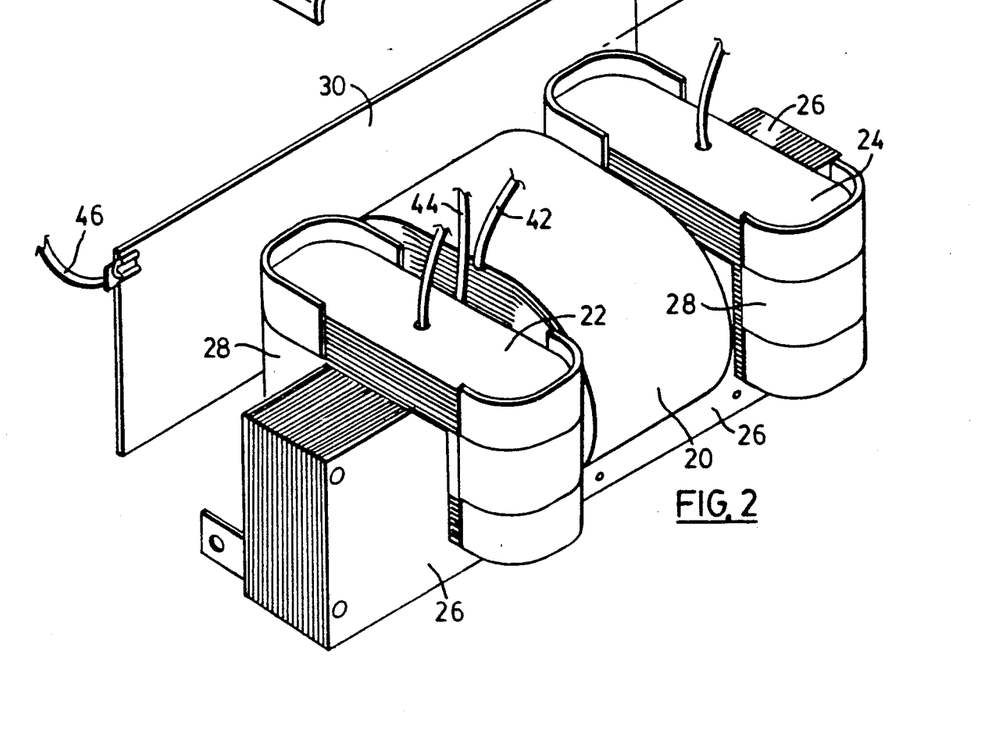
FIG. 2 is a perspective view of a portion of the transformer and transformer fault protector shown in FIG. 1.
Figure 3:
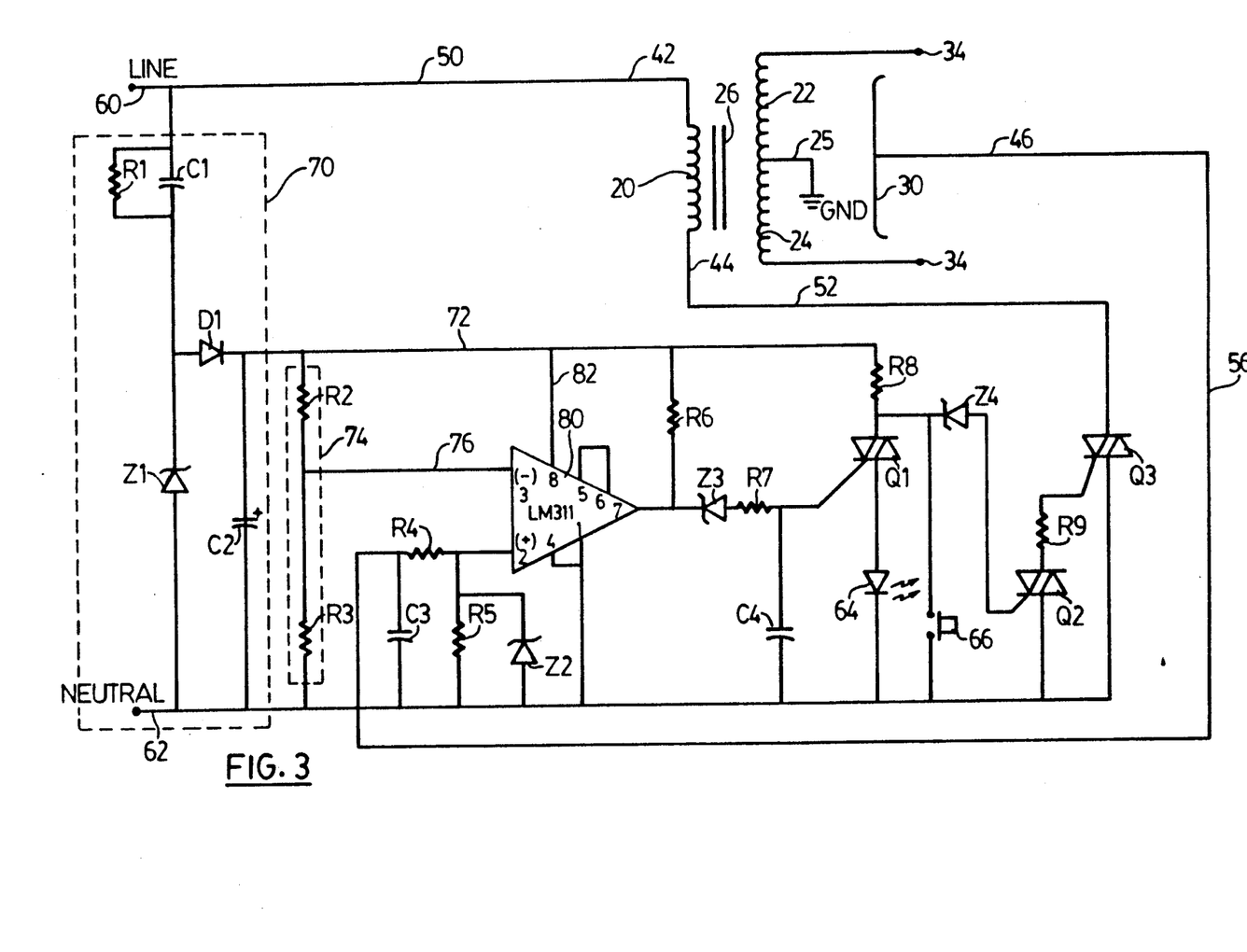
FIG. 3 is a schematic circuit diagram of the transformer and transformer fault protector shown in FIG. 1 and 2.

Referring now to FIGS. 1 to 3, a luminous tube or neon transformer is shown and generally indicated by reference numeral 10. Preferably, the transformer 10 is of the type disclosed in U.S. Pat. application Ser. No. 404,944 filed on Sep. 8, 1989, now abandoned, and assigned to the Applicant, the contents of which is incorporated herein by reference.

The transformer includes a housing 12 having an inner wall 14 separating the interior of the housing into two compartments 16,18 respectively. Compartment 16 houses the transformer windings. As can be seen, the neon transformer 10 includes a single primary winding 20 and a pair of secondary windings 22,24 respectively located on opposite sides of and spaced from the primary winding 20. The secondary windings 22,24 are connected in series with the midpoint of the series circuit being connected to ground GND via conductor 25. A core 26 formed from magnetizable material passes through the primary winding and the secondary windings. Magnetic shunts (not shown) are also provided between the secondary windings 22,24 and the primary windings 20. Insulation 28 surrounds the ends of the secondary windings 22,24.

In addition to the transformer windings, the transformer core 26 and the magnetic shunts, a conductive metal plate 30 forming part of a transformer fault protector (best shown in FIG. 3) is also located in the compartment 16. The plate 30 extends substantially along the length of the core 26 and is equally spaced at its ends from the transformer secondary windings 22,24 by a distance x. An asphalt compound 32 fills the compartment 16 so that the transformer windings, core and magnetic shunts as well as the plate 30 are buried. However, a pair of threaded rods 34, each of which is electrically connected to one of the secondary windings, projects upwardly from the top surface of the asphalt compound 32. A plastic cap 36 threadably engages with each rod 34 to permit conductors leading from the transformer load to pass through cut-outs 38 formed through the outer wall of the transformer housing 12 and be electrically connected and secured to the rods 34.

The interior wall 14 has a circular cut-out 40 formed through it to allow conductors 42,44 leading from the primary winding 20 and a conductor 46 extending from the plate 30 to pass into the other compartment 18. The conductors 42 to 46 are connected to detection and switching circuitry forming the remainder of the transformer fault protector as will be described herein.

A smaller housing 48 is located within the compartment 18 and houses the detection and switching circuitry mentioned previously. A number of conductors extend from the housing 48, two conductors 50,52 of which are connected to opposite ones of the transformer primary conductors 42,44 respectively via insulated cap connectors 54 and one conductor 56 of which is connected to conductor 46 extending from the plate 30 also via a cap connector 58. Two other conductors, namely a line conductor 60 and a neutral conductor 62 extend from the housing 48 and pass through a cut-out 63 formed through a wall of the housing 12 to permit the transformer 10 and the transformer fault protector to be connected to a power supply. Located on the outer wall of the housing 12 adjacent the compartment 18 is an LED 64 and a reset switch 66, both of which are in communication with and form part of the detection and switching circuitry as will be described hereinbelow.

Referring now to FIG. 3, the detection and switching circuitry is better illustrated. As can be seen, the line conductor 60 extending from the power supply passes through the housing 48 and is directly connected to the primary conductor 42 via the conductor 50 and the cap connector 54. The neutral conductor 62, however is not directly connected to the other primary conductor 44 via conductor 52 and cap connector 54 as will be described.

The line conductor 60 is also connected to the neutral conductor 62 by a voltage regulator and rectifier circuit 70. The regulator and rectifying circuit 70 includes a capacitor $C_1$ and a zener diode $Z_1$ connected in series and extending between the line and neutral conductors. A resistor $R_1$ is connected in parallel with the capacitor $C_1$. A diode $D_1$ has its anode connected between the capacitor $C_1$ and the zener diode $Z_1$ and provides its output to a supply conductor 72. The supply conductor 72 is connected to the neutral conductor 62 via a capacitor $C_2$ as well as by a voltage divider 74 constituted by resistors $R_2$ and $R_3$.

A conductor 76 is connected between the resistors $R_2$ and $R_3$ of the voltage divider 74 and terminates at the inverting terminal of a voltage comparator 80 constituted by an LM311 operational amplifier. The comparator 80 which receives its bias from the supply conductor 72 via conductor 82 provides its output to the cathode of another zener diode $Z_3$. A resistor $R_6$ is also connected to the cathode of the zener diode $Z_3$ as well as to the supply conductor 72.

The anode of the zener diode $Z_3$ is connected to the trigger pin of a triac $Q_1$ via a resistor $R_7$ as well as to the neutral conductor 62 via a capacitor $C_4$ and the resistor $R_7$. One of the other terminals of the triac $Q_1$ is connected to the supply conductor 72 via a resistor $R_8$ while the third terminal of the triac $Q_1$ is connected to the neutral conductor 62 via the LED 64.

A zener diode $Z_4$ has its cathode connected between the resistor $R_8$ and one terminal of the triac $Q_1$ while the other terminal of the zener diode $Z_4$ extends to the trigger pin of a second triac $Q_2$. The cathode of the zener diode $Z_4$ is also connected to the neutral conductor 62 via the reset switch 66. One of the other terminals of the triac $Q_2$ extends to the neutral conductor 62 while the third terminal of the triac $Q_2$ is connected to the trigger pin of yet another triac $Q_3$ via a resistor $R_9$. One of the other terminals of the triac $Q_3$ is connected to the neutral conductor 62 while the third terminal of the triac $Q_3$ is connected to conductor 52. Conductor 52 as mentioned previously is connected to the primary conductor 44 via the cap connector 54 thereby completing the circuit between the primary conductors 42,44 and the power supply via the line and neutral conductors 60,62.

Conductor 56 which is connected to conductor 46 extending from the plate 30 is connected to the non-inverting terminal of the comparator 80 via a resistor $R_4$. A capacitor $C_3$ extends between the neutral conductor 62 and the conductor 56. A parallel circuit including a resistor $R_5$ and another zener diode $Z_2$ extends between the neutral conductor 62 and the non-inverting terminal of the comparator 80.

The operation of the transformer 10 will no be described with particular emphasis on the operation of the transformer fault protection device. The present transformer fault protection device is based on electrostatic principals and the fact that a balanced, midpoint grounded and properly loaded luminous tube transformer will have terminal voltages on each of the two secondary terminals 34 that are equal in magnitude but opposite in phase with respect to the ground when the transformer primary is energized. Thus, if a break, an arcing ground fault or a direct ground fault occurs on either side of the transformer, the balance of the secondary terminal voltages is lost and thus, the fault can be detected.

In typical operation, when the line and the neutral conductors 60, 62 are connected across a 120 volt power supply, the components $C_1$, $Z_1$, $D_1$ and $C_2$ forming the voltage regulator and rectifying circuit 70 act to establish a 15 volt power supply which is applied to the supply conductor 72. When the voltage is established on the supply conductor 72, the voltage divider 74 acts to supply a 5 volt threshold voltage to conductor 76 which is in turn applied to the inverting terminal of the comparator 80. This maintains the output of the comparator low until a voltage greater than the threshold voltage is received on the non-inverting terminal of the comparator 80.

The 15 volt supply voltage which is also established at one terminal of the resistor $R_8$ causes zener diode $Z_4$ to go into avalanche so that a gate signal is applied to the trigger pin of triac $Q_2$. When this occurs, triac $Q_2$ closes thereby connecting the trigger pin of triac $Q_3$ to the neutral conductor 62. This causes triac $Q_3$ to conduct thereby connecting the primary winding 20 of the transformer 10 between the line and neutral conductors 60, 62 via conductors 50, 42, 44 and 52 respectively so that the transformer primary winding 20 is energized. This of course energizes the transformer secondary windings 22, 24 so that an output voltage is applied to the threaded rods 34 wherein it is conveyed to the transformer load via suitable conductors.

In normal operation, the voltages at the secondary windings 22, 24 are equal in magnitude and opposite in phase. Thus, the voltages induced in the plate 30 by each secondary winding 22, 24 cancel each other resulting in little or no net induced voltage in the plate 30. Accordingly, the voltage applied to the conductor 46 from the sensing plate 30 is substantially zero. This zero volt signal is applied to the comparator 80 via conductor 56 and resistor $R_4$ and since the magnitude of the voltage is less than the 5 volt threshold voltage applied to the inverting terminal of the comparator 80 via conductor 76, the output of the comparator 80 remains low. The zener diode $Z_3$ which receives the output of the comparator 80 ensures that the trigger pin of triac $Q_1$ remains isolated from the comparator output when the conductors 60, 62 are initially connected across the power supply. This permits the 15 volt power supply voltage to be established on supply conductor 72 and prevents improper operation of the circuit. This of course maintains the triac $Q_1$ in an open state so that triacs $Q_2$ and $Q_3$ remain in a closed condition to connect the transformer primary winding 20 across the power supply.

However, if a fault occurs in the transformer 10, the magnitudes of the voltages at each secondary winding will vary in magnitude resulting in a net voltage being induced in the plate 30. The induced voltage in the plate 30 is applied to the conductors 46, 56 so that the capacitance divider made up of the sensing plate 30 and capacitor $C_3$ presents a positive voltage to the non-inverting terminal of the comparator 80. The capacitor $C_3$ functions to reduce the voltage developed across the capacitance constituted by the secondary windings 22,24 and the sensing plate 30 to levels acceptable to the comparator 80. The zener diode $Z_2$ in the avalanche mode limits the voltage applied to the comparator 80 to a magnitude equal to approximately 15 volts while in the forward direction and limits the negative voltage applied to the comparator 80 at approximately $-1$ volt. The resistor $R_5$ functions to drain any residual charge on capacitor $C_3$ when the output voltage on conductor 56 drops low.

If the voltage applied to the inverting terminal of the comparator 80 exceeds 5 volts at any time as will typically occur when a transformer fault occurs, the comparator 80 output goes high. The high output of the comparator 80 is applied to the cathode of zener diode $Z_3$ causing it to go into avalanche thereby placing a voltage on the trigger pin of triac $Q_1$. This causes the triac $Q_1$ to conduct. Once triac $Q_1$ begins to conduct, the zener diode $Z_4$ moves out of an avalanche state thereby removing the bias on the trigger pin of triac $Q_2$ causing the triac $Q_2$ to open. This of course results in the removal of the bias on the trigger pin of $Q_3$ which in turn results in triac $Q_3$ opening. When this occurs, the transformer primary winding 20 is isolated from the power supply since the neutral conductor 62 becomes isolated from the line conductor 60.

When triac $Q_1$ becomes energized, the current previously applied to triac $Q_2$ via resistor $R_8$ and zener diode $Z_4$ is diverted through the LED 64 thereby turning it on to indicate a fault in the transformer 10. When the fault is removed and the output of the comparator 80 once again drops low, the switch 66 can be depressed to reset the circuit. When this is done, the triac $Q_1$ is shorted causing it to stop conducting. When the switch 66 is released, the zener diode $Z_4$ goes into avalanche once again thereby applying a trigger signal to triac $Q_2$. Once this is done, the triac $Q_3$ will conduct as explained previously thereby connecting the transformer primary winding between the line and neutral conductors 60, 62 respectively extending from the power supply.

Figure 4:
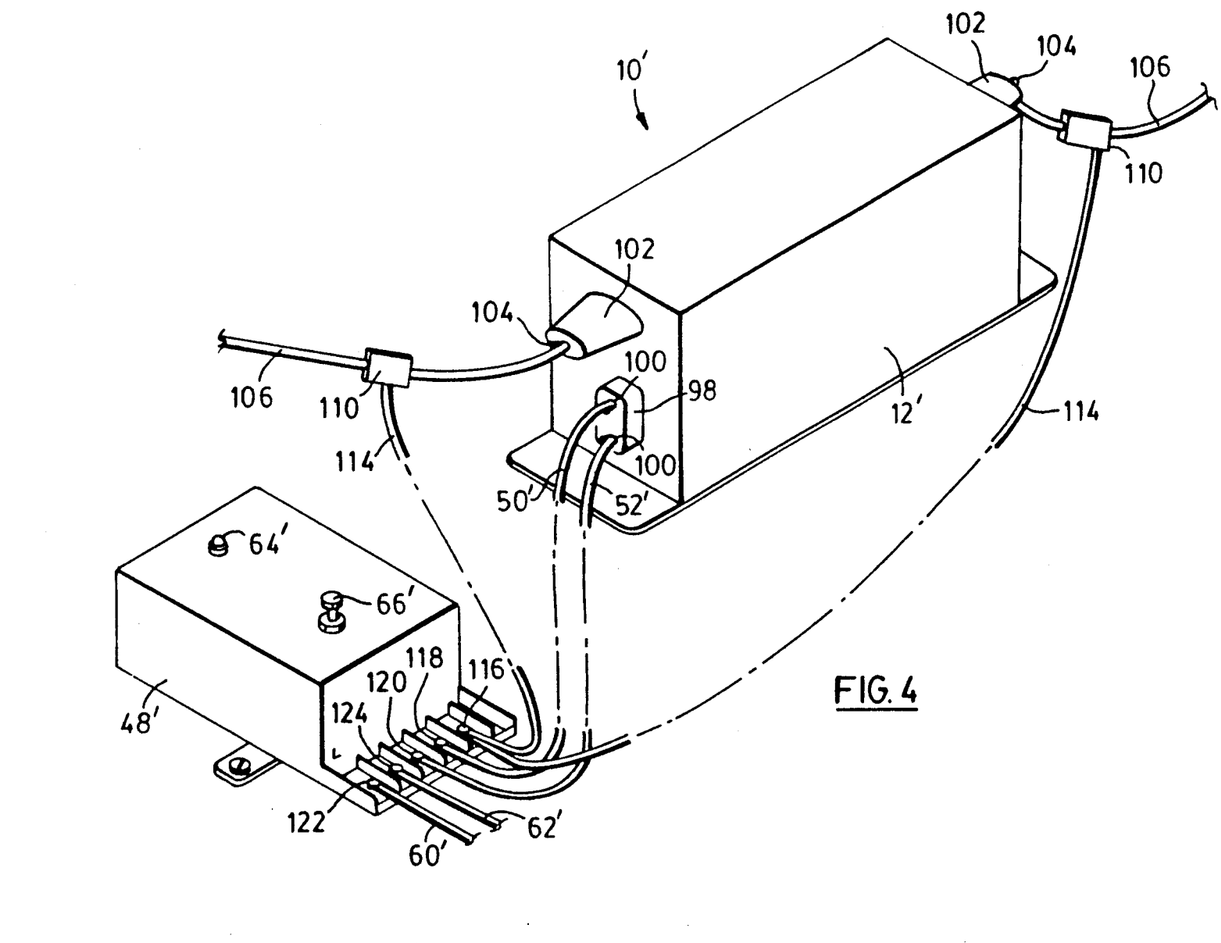
FIG. 4 is a perspective view of another luminous tube transformer connected to a transformer fault protector.
Figure 5:
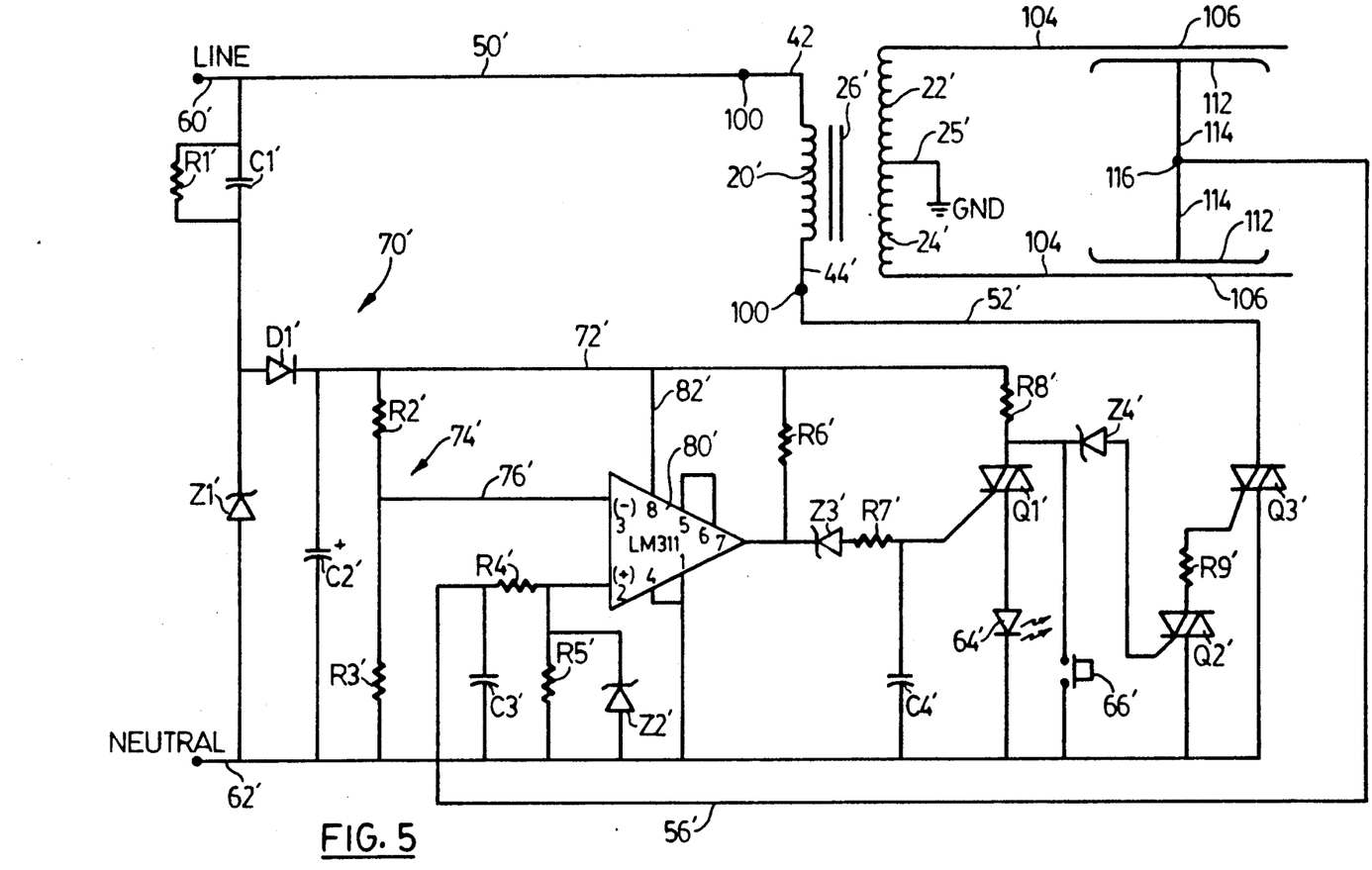
FIG. 5 is a circuit diagram of a portion of the transformer fault protector shown in FIG. 4.

Referring now to FIGS. 4 and 5, another embodiment of the transformer fault protector is illustrated. For the sake of clarity, in these Figures, like reference numerals will be used to indicate like components with a "'" added. In this embodiment, the transformer fault protector is used in conjunction with a conventional neon transformer 10' which has not been modified to include a sensing plate 30 in proximity to the transformer secondary windings 22' and 24' as shown in the previous embodiment.

As can be seen, the transformer 10' includes a housing 12' having an insulated bushing 98 through which a pair of primary terminals 100 pass. The terminals 100 each receive one of a pair of conductors 50', 52' extending from the detection and switching circuitry housing 48'. Internal conductors 42', 44' extend from the primary terminal 100 to the primary winding 20' within the transformer housing 12'. Insulated bushings 102 extend from opposite end walls of the transformer housing 12' and allow secondary terminals 104 to pass therethrough while isolating the terminals 104 from the transformer housing 12'. Conductors 106 extend from the secondary terminals 104 to allow the transformer 10' to be connected across the transformer load. Although not shown, conductors extend from the transformer secondary windings within the transformer housing and are connected to the secondary terminals.

A sense clip 110 having a small conductive plate 112 is connected to each conductor 106 extending from the transformer secondary terminals 104. A conductor 114 extends from each plate 112 and terminates at the sense terminal 116 provided on the housing 48'. The housing 48' also provides a pair of primary terminals 118, 120, each of which receives one of the conductors 50'522' respectively. Two additional terminals 122, 124 are also provided which receive the line and neutral conductors 60', 62' extending from the power supply to permit the transformer 10' and the transformer fault protector to be connected to the power supply.

FIG. 5 better illustrates the detection and switching circuitry and as should be noted it is virtually identical to the circuitry shown in FIG. 3. The difference between this embodiment and the previous embodiment is the provision of the sense clips 110 which monitor the voltage applied to each conductor 106 by the transformer secondary windings 22', 24' via the secondary terminals separately.

In operation, as in the previous embodiment when the line and neutral conductors 60' and 62' are connected across the power supply, the triac $Q_3$ closes so that the transformer primary 20' is energized. This in turn energizes the transformer secondary windings 22', 24'. When this occurs, an output voltage is applied to the secondary terminals 104 and conductors 106. The sense clips 110 with their plates 112 function in the same manner as the plate 30 and thus, when conductors 106 are energized, a voltage is induced in each plate and applied to conductor 114. When the transformer is operating normally, the voltage applied to each conductor 114 is equal in magnitude but opposite in phase and thus, the induced voltages on each conductor 114 cancel each other out when combined at terminal 116.

As in the previous embodiment, conductor 56' connected to the non-inverting terminal of the operational amplifier 80' is also connected to the terminal 116. Accordingly, in normal operation of the transformer 10', the voltage applied to the comparator 80' by the sense clips 110 is below the threshold voltage set by the voltage divider 74' on conductor 76'. This maintains the output of the comparator 80' low so that the triac $Q_3'$ remains closed.

However, when a transformer fault occurs and the secondary winding voltages become unbalanced, the output voltages applied to the conductors 106 also become unbalanced. This of course results in voltages unequal in magnitude and opposite in phase to be induced in each plate 112. These voltages are supplied to the terminal 116 via conductors 114 and since they are unequal in magnitude, a net voltage is supplied to the non-inverting terminal of the comparator 80' via conductor 56'. If the net voltage is above the threshold value, the output of the comparator 80' goes high causing the comparator 80' to trigger the triac $Q_1'$. As described previously, this operation causes the triac $Q_3'$ to open thereby isolating the transformer primary winding 20' from the power supply and causing the LED 64' to be illuminated. Similar to the previous embodiment, removal of the fault condition and actuation of the switch 66' resets the circuit to reconnect the transformer primary winding 20' to the power supply.

Figure 6:
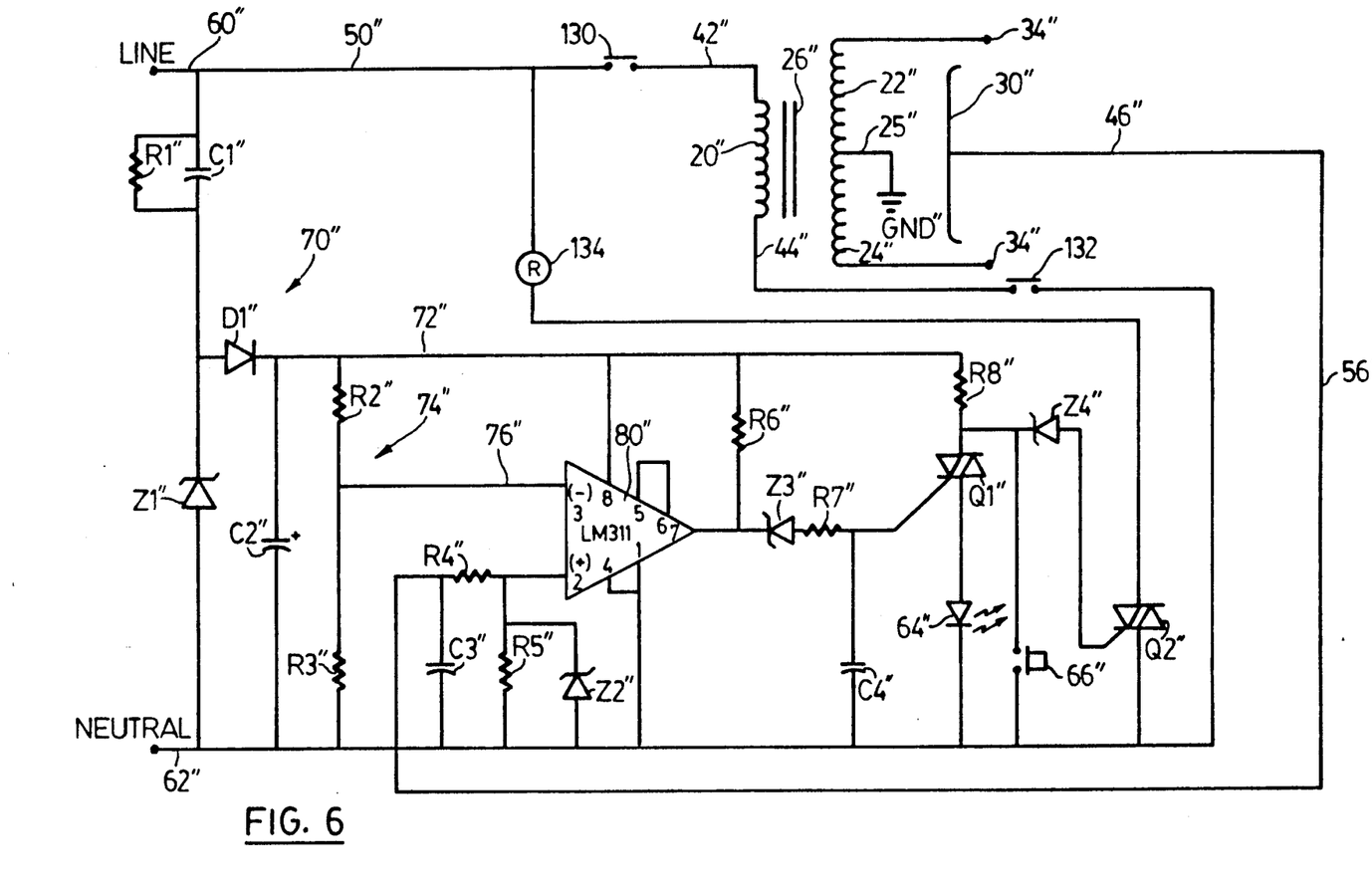
FIG. 6 is a circuit diagram of an alternative embodiment of a transformer fault protector.

FIG. 6 shows yet another embodiment of the transformer fault protector which is suitable for sue with either the sensing plate 30" or the sense clips 110 even though the Figure shows the circuit in combination with the sensing plate. In this embodiment, like reference numerals will be used to indicate like components with a "''" added for clarity.

The circuit shown in FIG. 6 is for use in applications wherein both terminals of the transformer primary winding 20" must be disconnected from the power supply upon detection of a transformer fault. As can be seen, the fault protector includes a pair of relay contacts 130, 132, one relay contact 130 being connected in series with the line conductor 60" and the primary conductor 42" and the other relay contact 132 being connected in series with the primary conductor 44" and the neutral conductor 62". In this embodiment, the relay contacts 130, 132 replace the triac $Q_3$ and thus, this circuit is substantially the same as the previous circuits except that the one terminal of triac $Q_2''$ is connected to the line conductor 60" via a relay coil 134 as opposed to the trigger pin of triac $Q_3$.

In normal operation when the transformer secondary windings 22" and 24" are balanced, and the voltage applied to conductor 56" by the plate 30" is insufficient to cause comparator 80" to trigger triac $Q_1''$ to an on condition, triac $Q_2''$ remains in a closed condition. This of course allows current to flow from the line conductor 60" through triac $Q_2''$ to the neutral conductor 62" via the relay coil 134. Once the relay coil 134 becomes energized, the relay contacts 130, 132 close thereby connecting the transformer primary winding 20" to the power supply via the line and neutral conductors 60" and 62" respectively.

However, when a transformer fault occurs and the secondary winding voltages are no longer balanced, the output of the comparator 80" triggers triac $Q_1''$ thereby opening triac $Q_2''$. When this occurs, current flow through the relay coil 134 stops causing the relay contacts 130, 132 to open thereby isolating both terminals of the transformer primary winding 20" from the power supply. Similar to the previous embodiments, once the triac $Q_1''$ closes, current is fed through the LED 64" causing it to illuminate. In addition, once the transformer fault has been removed and the comparator 80" output drops low, actuation of the switch 66" resets the circuit so that the transformer primary winding 20" is reconnected to the power supply via the line and neutral conductors.

As should be apparent, the present invention provides an economical and relatively simple circuit for detecting transformer faults and for isolating the transformer primary winding from the power supply when a fault occurs. This of course substantially eliminates the risk of electrical shock and the occurrence of transformer fires due to a fault condition. In addition, since a capacitive divider is used to detect a fault condition based on electrostatics, direct connection of the fault protector to the high voltage secondary windings is not required thereby facilitating the implementation of the fault protector in existing transformers and the implementation when manufacturing transformers incorporating the fault protector.

I claim:

1. A transformer fault protection device to be connected to a transformer having a primary winding and at least two secondary windings connected to ground, said transformer fault protection device comprising:
   sensing means to sense the output voltage generated by each of said secondary windings and generating a control signal when an imbalance in the output voltages generated by said secondary windings is detected wherein said sensing means is in the form of at least one conductive plate positioned near but spaced from said secondary windings, said control signal being constituted by a voltage induced in said at least one conductive plate by said secondary windings; and
   switch means to be connected in series with a power supply and at least one terminal of said primary winding, said switch means being conditioned to an open condition in response to said control signal to isolate said primary winding from said power supply.

2. A transformer fault protection device as defined in claim 1 wherein said conductive plate is to be positioned adjacent the secondary windings of said transformer and extends substantially the length of the transformer core, said plate generating said voltage when an imbalance in the voltage at the secondary windings occurs.

3. A transformer fault protection device as defined in claim 1 wherein said sensing means includes a pair of conductive plates, each of said conductive plates to be positioned adjacent the output of one of said secondary windings, each of said secondary windings inducing a voltage in one of said conductive plates, said conductive plates being interconnected via a conductor, said conductor providing said control signal to said switch means when an imbalance in the voltage at the secondary windings occurs.

4. A transformer fault protection device as defined in claim 3 wherein said pair of conductive plates are positioned adjacent output conductors extending from said transformer secondary windings.

5. A transformer fault protection device as defined in claim 1 further including comparing means receiving said control signal and a threshold voltage, said comparing means providing said control signal to said switch means when the magnitude of said control signal is detected as being greater than said threshold voltage.

6. A transformer fault protection device as defined in claim 1 further including indication means to provide a visual indication when said switch means is conditioned to said open condition.

7. A transformer fault protection device as defined in claim 1 further including reset means to reset said switch means to a closed condition to reconnect the transformer primary winding to said power supply when the voltage at said secondary windings returns to a balanced condition.

8. A transformer fault protection device as defined in claim 1 wherein said switch means includes a pair of switches, each of which is to be connected in series with said power supply and opposite terminals of said transformer primary, each of said switches being conditioned to said open condition in response to said control signal.

9. A transformer fault protection device as defined in claim 8 wherein said switches are in the form of relay contacts.

10. A transformer comprising:
    a primary winding to be connected to a power supply;
    a pair of secondary windings connected in series to form a series circuit with the mid-point of the series circuit being connected to ground;
    a transformer core formed from magnetizable material and passing through said transformer primary and secondary windings;
    sensing means spaced from said secondary windings and sensing the output voltage generated by each of said secondary windings when said primary winding is energized by said power supply, said sensing means generating a control signal when an imbalance in the output voltages generated by said secondary windings is detected wherein said sensing means is in the form of at least one conductive plate positioned near but spaced from said secondary windings, said control signal being constituted by a voltage induced in said at least one conductive plate by said secondary windings; and
    switch means associated with at least one terminal of said transformer primary winding, said switch means being conditioned to an open condition in response to said control signal to isolate said primary winding from said power supply.

11. A transformer as defined in claim 10 wherein said conductive plate is positioned adjacent the secondary windings of said transformer and extends substantially the length of the transformer core, said conductive plate generating said voltage when an imbalance in the output voltage at the secondary windings occurs.

12. A transformer as defined in claim 11 wherein said sensing means includes a pair of conductive plates, each being located adjacent one of said secondary windings, said secondary windings when energized inducing a voltage in said conductive plates, said conductive plates being interconnected via a conductor, said conductor providing said control signal to said switch means when an imbalance in the voltage generated by said secondary windings occurs.

13. A transformer as defined in claim 11 wherein said pair of conductive plates are located adjacent output conductors extending from said transformer secondary windings.

14. A transformer as defined in claim 11 further including comparing means receiving said control signal and a threshold voltage, said comparing means providing said control signal to said switch means to condition said switch means to said open condition when the magnitude of said control signal is detected as being greater than said threshold voltage.

15. A transformer as defined in claim 10 further including indication means to provide a visual indication when said switch means is conditioned to said open condition.

16. A transformer as defined in claim 10 further including reset means to reset said switch means to a closed condition to reconnect the transformer primary winding to said power supply, when the voltage at said secondary winding returns to a balanced condition.

17. A transformer as defined in claim 10 wherein said switch means includes a pair of switches, each of which is connected in series with said power supply and opposite terminals of said transformer primary winding, each of said switches being conditioned to said open condition in response to said control signal.

18. A transformer as defined in claim 17 wherein said switches are in the form of relay contacts.

19. A transformer as defined in claim 10 wherein said control signal has a magnitude proportional to the imbalance in said output voltages generated by said secondary windings, said switch means being conditioned to said open condition when the magnitude of said control signal exceeds a threshold value.

* * * * *